(12) United States Patent
Shao et al.

(10) Patent No.: US 11,754,999 B1
(45) Date of Patent: Sep. 12, 2023

(54) INDUSTRIAL INTERNET OF THINGS BASED ON EVENT SEQUENCE ANALYSIS AND PREDICTION, PREDICTION METHOD, AND STORAGE MEDIUM THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Xiaojun Wei, Chengdu (CN); Haitang Xiang, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/932,282

(22) Filed: Sep. 14, 2022

(30) Foreign Application Priority Data

Jun. 29, 2022 (CN) .......................... 202210746016.1

(51) Int. Cl.
*G05B 19/4155* (2006.01)
(52) U.S. Cl.
CPC .................... *G05B 19/4155* (2013.01); *G05B 2219/31156* (2013.01)
(58) Field of Classification Search
None
See application file for complete search history.

(56) References Cited

U.S. PATENT DOCUMENTS 11,205,124 B1    12/2021  Yang
11,625,028 B1 *   4/2023  Shao .................. G05B 19/4185
                                                  700/95

FOREIGN PATENT DOCUMENTS

| CN | 107851462 A | 3/2018 |
| CN | 109542952 A | 3/2019 |
| CN | 111209168 A | 5/2020 |
| CN | 112202736 A | 1/2021 |
| CN | 114202065 A | 3/2022 |
| CN | 114488988 A | 5/2022 |
| CN | 114511112 A | 5/2022 |
| WO | 2019057055 A1 | 3/2019 |

* cited by examiner

*Primary Examiner* — Ryan A Jarrett
(74) *Attorney, Agent, or Firm* — METIS IP LLC

(57) ABSTRACT

The embodiments of the present disclosure provide an Industrial Internet of Things based on an event sequence analysis and prediction, a method, and a storage medium thereof. The Industrial Internet of Things includes a management platform, and the management platform is configured to obtain an ordered set of instructions for a preset time period, the ordered set of instructions including a plurality of instructions, and instruction content of each instruction of the plurality of instructions including at least one of instruction type, instruction parameter, and instruction execution time; determine whether there is an abnormal instruction based on the ordered set of instructions; and analyze and modify the abnormal instruction in response to a determination that there is the abnormal instruction.

9 Claims, 6 Drawing Sheets

300

310

When the user platform sends a manufacturing task instruction, a corresponding sub platform of the service platform receiving the manufacturing task instruction, converting the manufacturing task instruction into a configuration file recognized by the management platform, and sending the configuration file to a corresponding sub platform of the management platform, the manufacturing task instruction including at least one manufacturing task and an execution time corresponding to the manufacturing task

320

The corresponding sub platform of the management platform receiving the configuration file, using a cyclic neural network model to carry out a sequence modeling for data in the configuration file in time order to form sequence modeling data, and sending the sequence modeling data together with the configuration file to the general platform of the management platform

330

After receiving and storing the corresponding sequence modeling data, the general platform of the management platform decomposing the sequence modeling data sent by all the sub platforms of the management platform according to execution times, and sorting all decomposed sequence modeling data according to a sequence logic order from beginning to end to form a series of event sequence data, each sequence may corresponding to a sequence point, the general platform of the management platform analyzing and predicting the event sequence data through a probability suffix tree model, and executing operations based on an analysis and prediction result When the analysis and prediction result is that the task is normal, the general platform of the management platform sending received configuration files to a corresponding sub platform of the sensor network platform, the corresponding sub platform of the sensor network platform receiving the configuration files and converting the configuration files into instruction files recognized by the one or more object platforms and sending the instruction files to the one or more object platforms, and the one or more object platforms receiving the instruction files and executing an intelligent manufacturing based on the instruction files

340

When the analysis and prediction result is that the task is abnormal, the general platform of the management platform refusing to receive all the configuration files corresponding to the manufacturing task, deleting the corresponding sequence modeling data, obtaining associated manufacturing data corresponding to abnormal timing points, and sending the associated manufacturing data to a corresponding sub platform of the management platform, the corresponding sub platform of the management platform compiling the associated manufacturing data and sending the associated manufacturing data to a corresponding sub platform of the service platform, the corresponding sub platform of the service platform storing the associated manufacturing data and sending a task failure instruction to the user platform; the associated manufacturing data including associated sequence modeling data corresponding to the abnormal timing points, sub platform information of the management platform corresponding to the sequence modeling data, and sub platform information of the service platform

410
Determining a rationality of each instruction in the ordered set of instructions

420
Determining an instruction as the abnormal instruction in response to a determination that the rationality of the instruction is not satisfying a preset condition

FIG. 4 under the first layer, when running, the instruction may form instruction conflict or task conflict with other equipment, causing equipment program error, deadlock, or equipment crash.

INDUSTRIAL INTERNET OF THINGS BASED ON EVENT SEQUENCE ANALYSIS AND PREDICTION, PREDICTION METHOD, AND STORAGE MEDIUM THEREOF

CROSS-REFERENCE TO RELATED APPLICATIONS

The present application claims priority to Chinese Patent Application No. CN202210746016.1, filed on Jun. 29, 2022, the contents of which are hereby incorporated by reference to its entirety.

TECHNICAL FIELD

The present disclosure generally relates to Industrial Internet of Things technology, in particular to Industrial Internet of Things based on an event sequence analysis and prediction, method, and storage medium thereof.

BACKGROUND

Intelligent manufacturing (IM) is a man-machine integrated intelligent system composed of intelligent machines and human experts. It can carry out intelligent activities in the manufacturing process, such as analysis, reasoning, judgment, conception, and decision-making. Through the cooperation between people and intelligent machines, it can expand, extend, and partially replace mental work of human experts in the manufacturing process. In the actual use process, because the number of intelligent manufacturing equipment and intelligent management equipment corresponding to different levels, regions, and categories involved in intelligent manufacturing is large, and most of them are on one production line or manufacturing line, the manufacturing tasks of each other will be related and affected. When the instruction is adjusted, the intelligent manufacturing equipment or intelligent management equipment involved in the instruction may form instruction conflict or task conflict with other equipment when running the instruction, causing equipment program error, deadlock, or equipment crash, which also affect the smooth connection of process, material transportation sequence, equipment processing steps, etc. during manufacturing, thus leading to large-scale failure, paralysis or error reporting of intelligent manufacturing equipment, and causing manufacturing risk.

Therefore, in order to solve the above problems, it is desirable to provide an Industrial Internet of Things based on an event sequence analysis and prediction and a method thereof.

SUMMARY

One of the embodiments of the present disclosure provides an Industrial Internet of Things based on an event sequence analysis and prediction, the Industrial Internet of Things including a management platform. The management platform is configured to obtain an ordered set of instructions for a preset time period, the ordered set of instructions including a plurality of instructions and instruction content of each instruction of the plurality of instructions including at least one of instruction type, instruction parameter, and instruction execution time; determine whether there is an abnormal instruction based on the ordered set of instructions; and analyze and modify the abnormal instruction in response to a determination that there is the abnormal instruction.

One of the embodiments of the present disclosure provides a method for an event sequence analysis and prediction, which is implemented by a management platform of an Industrial Internet of Things based on an event sequence analysis and prediction, comprising: obtaining an ordered set of instructions for a preset time period, the ordered set of instructions including a plurality of instructions, and instruction content of each instruction of the plurality of instructions including at least one of instruction type, instruction parameter and instruction execution time; determining whether there is an abnormal instruction based on the ordered set of instructions; and analyzing and modifying the abnormal instruction in response to a determination that there is the abnormal instruction.

One of the embodiments of the present disclosure provides a non-transitory computer-readable storage medium, the storage medium storing computer instructions, when the computer instructions are executed by a processor, causing the processor implements the method above.

BRIEF DESCRIPTION OF THE DRAWINGS

The present disclosure will be further described in the form of exemplary embodiments, which will be described in detail by the accompanying drawings. These embodiments are not restrictive. In these embodiments, the same number represents the same structure, wherein:

FIG. 3 is a flowchart of a method of an Industrial Internet of Things based on an event sequence analysis and prediction according to some embodiments of the present disclosure;

FIG. 4 is an exemplary flowchart of determining an abnormal instruction according to some embodiments of the present disclosure;

DETAILED DESCRIPTION

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the figure represents the same structure or operation.

It should be understood that the "system", "device", "unit" and/or "module" used herein is a method for distinguishing different components, elements, parts or assemblies at different levels. However, if other words can achieve the same purpose, they can be replaced by other expressions.

As shown in the description and the claims, unless the context expressly indicates exceptions, the words "a", "an", "the", "one", and/or "this" do not specifically refer to the singular, but may also include the plural; and the plural forms may be intended to include the singular forms as well, unless the context clearly indicates otherwise. Generally speaking, the terms "include" only indicate that the steps and elements that have been clearly identified are included, and these steps and elements do not constitute an exclusive list. Methods or equipment may also include other steps or elements.

A flowchart is used in this disclosure to explain the operation performed by the system according to the embodiment of the present disclosure. It should be understood that the previous or subsequent operations are not necessarily performed accurately in order. Instead, the steps may be processed in reverse order or simultaneously. At the same time, you can add other operations to these processes, or remove one or more steps from these processes.

Figure 1:
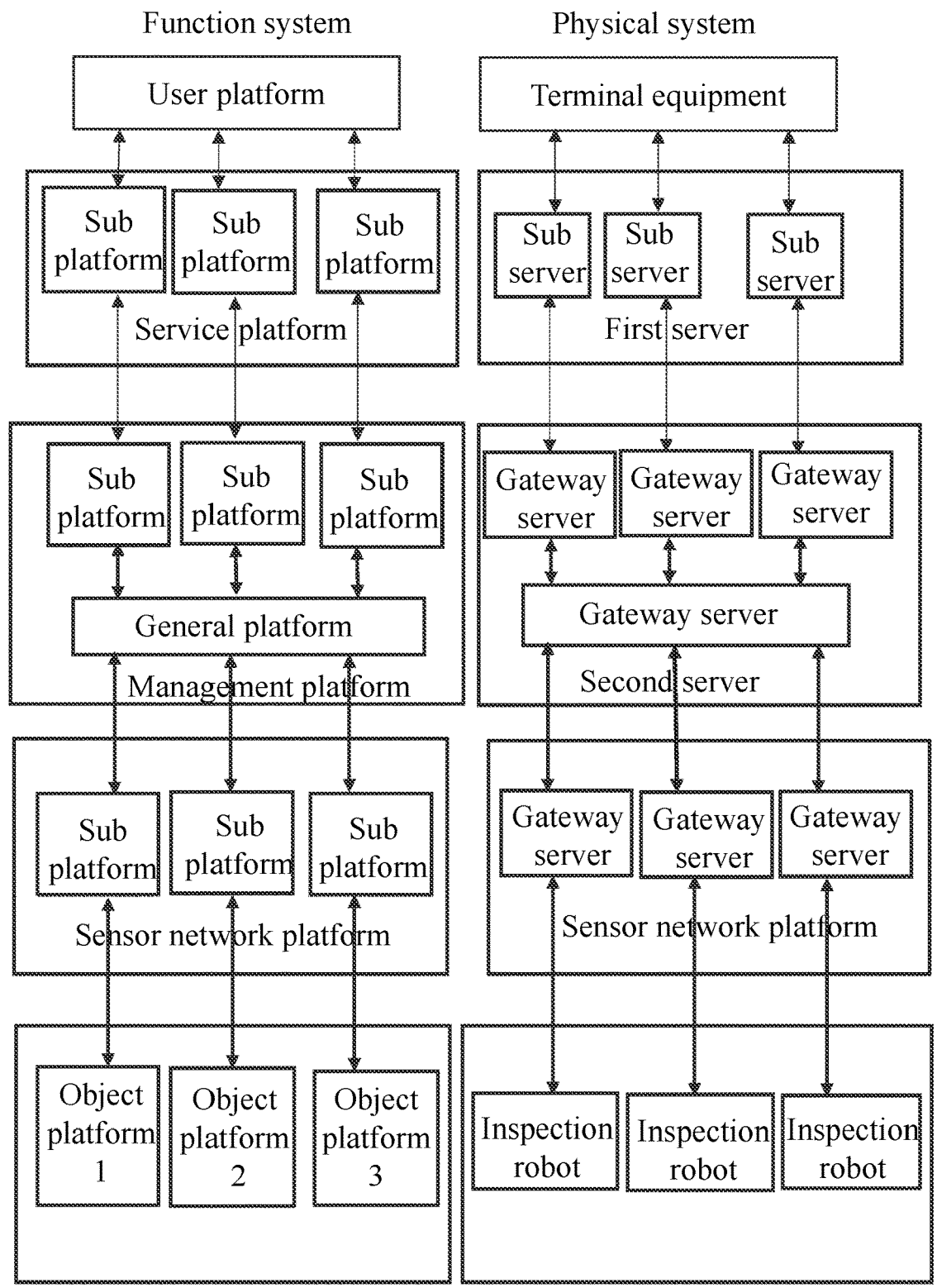
FIG. 1 is a structural frame diagram of an Industrial Internet of Things based on an event sequence analysis and prediction according to some embodiments of the present disclosure.

FIG. 1 is a structural frame diagram of an Industrial Internet of Things based on an event sequence analysis and prediction according to some embodiments of the present disclosure.

As shown in FIG. 1, a first embodiment of the present disclosure aims to provide an Industrial Internet of Things based on an event sequence analysis and prediction. A structural frame diagram 100 includes a user platform, a service platform, a management platform, a sensor network platform, and one or more object platforms, which are interacted sequentially from top to bottom.

The service platform and the sensor network platform may be both arranged in an independent layout, and the management platform may be arranged in a rear sub platform layout; the independent layout means that the service platform and the sensor network platform are provided with a plurality of independent sub platforms, and the plurality of independent sub platforms respectively perform data storage, data processing and/or data transmission for different data; the rear sub platform layout means that the management platform is provided with a general platform of the management platform and a plurality of sub platforms of the management platform, the plurality of sub platforms of the management platform respectively store and process data of different types or different receiving objects sent by the service platform, and the general platform of the management platform stores and processes data of the plurality of sub platforms of the management platform after summarizing, and transmits the data of the plurality of sub platforms of the management platform to the sensor network platform; and the one or more object platforms may be configured as one or more intelligent manufacturing devices.

When the user platform sends a manufacturing task instruction, a corresponding sub platform of the service platform may receive the manufacturing task instruction, convert the manufacturing task instruction into a configuration file recognized by the management platform, and send the configuration file to a corresponding sub platform of the management platform, the manufacturing task instruction including at least one manufacturing task and an execution time corresponding to the manufacturing task.

The corresponding sub platform of the management platform may receive the configuration file, use a cyclic neural network model to carry out a sequence modeling for data in the configuration file in time order to form sequence modeling data, and send the sequence modeling data together with the configuration file to the general platform of the management platform.

After receiving and storing the corresponding sequence modeling data, the general platform of the management platform may decompose the sequence modeling data sent by all the sub platforms of the management platform according to execution times, and sort all decomposed sequence modeling data according to a sequence logic order from beginning to end to form a series of event sequence data, each sequence corresponding to a sequence point, the general platform of the management platform may analyze and predict the event sequence data through a probability suffix tree model, and execute operations based on an analysis and prediction result.

When the analysis and prediction result is that the task is normal, the general platform of the management platform may send received configuration files to a corresponding sub platform of the sensor network platform, the corresponding sub platform of the sensor network platform may receive the configuration files and convert the configuration files into instruction files recognizable by the one or more object platforms and send the instruction files to the one or more object platforms, and the one or more object platforms may receive the instruction files and execute intelligent manufacturing based on the instruction files.

In some embodiments, when the analysis and prediction result is that the task is abnormal, the general platform of the management platform may refuse to receive all the configuration files corresponding to the manufacturing task, delete the corresponding sequence modeling data, obtain associated manufacturing data corresponding to abnormal timing points, and send the associated manufacturing data to a corresponding sub platform of the management platform, the corresponding sub platform of the management platform may compile the associated manufacturing data and send the associated manufacturing data to a corresponding sub platform of the service platform, the corresponding sub platform of the service platform may store the associated manufacturing data and send a task failure instruction to the user platform; the associated manufacturing data including associated sequence modeling data corresponding to the abnormal timing points, sub platform information of the management platform corresponding to the sequence modeling data, and sub platform information of the service platform.

In some embodiments, the manufacturing task instruction sent by the user platform may be received and processed by a unique service platform corresponding to the user platform, and then sent to a unique sub platform of the management platform to ensure a unique transmission path of data and ensure a unity and integrity of the data. Secondly, the sub platform of the management platform may carry out sequence modeling through the cyclic neural network model, which may convert the instruction into corresponding sequence modeling data. Therefore, the data may be preprocessed to reduce the data processing pressure of the general platform of the management platform. Based on this architecture, it may also be used as a data buffer area to avoid problems of large data volume and many data processing processes caused by the instruction data being directly sent to the general platform of the management platform, and further reduce a demand for data processing capacity of the general platform of the management platform. After the general platform of the management platform obtains the corresponding sequence modeling data, the general platform of the management platform may convert all sequence modeling data into event sequence data to form a column of the event sequence data, and perform data operation on the event sequence data. It may judge and predict whether there is any abnormality in the task composed of the whole event through operation results, so that abnormal processing may be carried out in advance to ensure a smooth implementation and mutual coordination of the whole intelligent manufacturing system.

It should be noted that user platforms may be one or more, no matter one or more, one or more user platforms may all correspond to one or more independent service platforms, so as to realize independent transmission and processing of data.

It should be further explained that the user platform in the embodiment may be a desktop computer, tablet computer, notebook computer, mobile phone, or other electronic device capable of data processing and data communication, which is not limited here. In a specific application, a first server and a second server may adopt a single server or a server cluster, which are not limited here. It should be understood that data processing process mentioned in the embodiment may be processed by a processor of the server, and data stored in the server may be stored on a storage device of the server, such as a hard disk or other memory. In specific applications, the sensor network platform may adopt a plurality of groups of gateway servers or a plurality of groups of intelligent routers, which are not limited here. It should be understood that the data processing process mentioned in the embodiments of the present disclosure may be processed by a processor of the gateway server, and data stored in the gateway server may be stored on a storage device of the gateway server, such as a hard disk and SSD, etc.

In some embodiments, the corresponding sub platform of the management platform receives the configuration file, uses a cyclic neural network model to carry out a sequence modeling for data in the configuration file in time order to form sequence modeling data, and sends the sequence modeling data together with the configuration file to the general platform of the management platform.

Specifically, the corresponding sub platform of the management platform may receive the configuration file and extract the manufacturing task and the execution time corresponding to the manufacturing task in the configuration file; input the manufacturing task and the execution time corresponding to the manufacturing task into the cyclic neural network model, output sequence codes of the execution time and execution codes of the manufacturing task, associate the sequence codes and the corresponding execution codes, sort all the sequence codes according to a sequence, and perform the sequence modeling for the sequence codes and the execution codes; and send the sequence modeling data as final data, which is formed by the sequence modeling, together with the configuration file to the general platform of the management platform.

When a recurrent neural network model (RNN) is running, input of the RNN may be data of a plurality of manufacturing tasks and execution times corresponding to the plurality of manufacturing tasks, while output of the RNN may be the sequence modeling data. This method can well convert the manufacturing tasks and execution times into data required by the subsequent management platform, thereby reducing a data processing volume of the management platform.

Based on this, the recurrent neural network model may be obtained by conventional machine learning training. Specifically, a large count of real existing manufacturing task databases is used to carry out machine learning. Through input data of the manufacturing task and the corresponding execution time, correct execution codes and sequence codes may be given, and corresponding codes may be correctly sequenced to perform sequence modeling. Through continuous learning, when the circular neural network model is completed, the sequence modeling data may be output by inputting the manufacturing task and the execution time into the circular neural network model. Since the machine learning is a relatively conventional technical means, the description is not repeated here. Those skilled in the art can fully realize an establishment of the cyclic neural network model on the basis of the records of the present disclosure in combination with the existing technical knowledge. As different implementation types, the execution codes and sequence codes may set code types and rules according to enterprise needs, such as existing sequence codes, memory code, interval code, and other types and coding rules.

In some embodiments, after receiving the corresponding sequence modeling data, the general platform of the management platform may decompose the sequence modeling data sent by all the sub platforms of the management platform according to execution times, and sort all decomposed sequence modeling data according to a sequence logic order from beginning to end to form a series of event sequence data, each sequence may correspond to a sequence point, and the general platform of the management platform may analyze the event sequence data through the probability suffix tree model.

Specifically, after receiving the corresponding sequence modeling data, the general platform of the management platform may extract the sequence modeling data sent by all the sub platforms of the management platform; take the sequence codes and the corresponding execution codes as a group of data, and decompose all the sequence modeling data into a plurality of groups of sub data; sort the sequence codes according to the sequence logic order, and sort all the execution codes from beginning to end according to the sequence logic order to form the series of event sequence data, each different sequence may correspond to a different sequence point; input the event sequence data to the probability suffix tree model, and the probability suffix tree model may execute the execution codes in the event sequence data and perform analysis based on an execution codes result.

The general platform of the management platform may determine execution exceptions of the corresponding timing points through the time sequence based on sequences, so that all sequence modeling data may be subjected to event analysis to determine code executions of each timing point through analysis results, so that when there is an exception in the future, it may be well modified based on the timing points.

It should be noted that the probability suffix tree model may also be trained by the machine learning. For example, a lot of existing event sequence data is input as objects or events and the task analysis results are given. After countless learning and training of the probability suffix tree model, timing points data are output to satisfy the setting requirements. This part of the technology can be easily realized in combination with the existing technology, this present disclosure will not further describe its specific learning process.

In some embodiments, the performing analysis based on an execution codes result may include inputting the execution codes as input data to the probability suffix tree model, the probability suffix tree model simulating an operation of the execution codes and outputting timing points that do not conform to operation rules of the probability suffix tree model as the abnormal timing points; when there is at least one abnormal timing point in the probability suffix tree model, determining that the task is abnormal; and when there is no abnormal timing point in the probability suffix tree model, determining that the task is normal.

When there is an abnormal timing point, it indicates that there may be a problem with the execution codes executed at the timing point. Therefore, as long as there is an abnormal timing point, it corresponds to an error position of the execution codes, so as to carry out the event analysis on all the execution codes and give judgment data for subsequent repair. In some embodiments, the associated manufacturing data corresponding to the abnormal timing points may be obtained and sent to the corresponding sub platform of the management platform, the corresponding sub platform of the management platform may compile the associated manufacturing data and send it to the corresponding sub platform of the service platform, and the corresponding sub platform of the service platform may store the associated manufacturing data and send the task failure instruction to the user platform.

Specifically, the general platform of the management platform may sort the abnormal timing points output by the probability suffix tree model, and send the associated manufacturing data corresponding to each abnormal timing point to the sub platform of the management platform that issue the manufacturing task instruction. The corresponding sub platform of the management platform may send the received associated manufacturing data of all the abnormal timing points to the corresponding sub platform of the service platform; the corresponding sub platform of the service platform may receive the associated manufacturing data and store the associated manufacturing data into task abnormal comparison data according to the sequence logic order, and send the task failure instruction to the user platform at a same time.

In some embodiments, after receiving the task failure instruction, the user platform may send an abnormal timing point query instruction to the corresponding sub platform of the service platform; the corresponding sub platform of the service platform may send the associated manufacturing data to the user platform, and the user platform may query the abnormal timing points based on the associated manufacturing data.

In this embodiment, the associated manufacturing data corresponding to each abnormal timing point may be sent to the user platform, so that the user platform may call the associated manufacturing data for analysis and coordination, and remodify the task instruction.

It should be noted that there may be sequence modeling data sent by one or more different sub platforms of the management platform at one timing point, that is, one timing point may correspond to one or more sequence modeling data. When an abnormal timing point occurs, in order to facilitate the user platform to correct the manufacturing task instruction, this embodiment considers one or more sequence modeling data existing in the abnormal timing point to be problematic, thereby facilitating subsequent modification. For example, when there are a plurality of sequence modeling data corresponding to an abnormal timing point, the user platform may obtain all sequence modeling data of the abnormal timing point, so as to analyze a cause of an instruction error based on all the sequence modeling data, such as whether execution times of the intelligent manufacturing device overlaps and intersects (a same device may only execute one manufacturing task or instruction at a certain time), so that the manufacturing task error may be overcome by modifying the execution time of the corresponding sequence modeling data.

In some embodiments, the Industrial Internet of Things may also be configured to perform operations: when performing the intelligent manufacturing, all the object platforms may send real-time manufacturing data generated by all the object platforms to corresponding sub platforms of the sensor network platform; the corresponding sub platforms of the sensor network platform may receive the real-time manufacturing data, compile the real-time manufacturing data into a compiled file recognized by the management platform, and send the compiled file to the general platform of the management platform; after receiving the compiled file, the general platform of the management platform may send the compiled file to the corresponding sub platform of the management platform, the corresponding sub platform of the management platform may receive and store the compiled file, and perform the sequence modeling for the compiled file to form real-time sequence modeling data and send the real-time sequence modeling data back to the general platform of the management platform; the general platform of the management platform may receive the real-time sequence modeling data and replace corresponding original sequence modeling data with the real-time sequence modeling data according to a formation mode of the event sequence data to form new event sequence data, and analyze and predict based on the new event sequence data.

In a process of the intelligent manufacturing, some tasks may be performed incorrectly due to equipment faults, deviations, failures, and other problems, which may affect other equipment and even an entire intelligent manufacturing system. Therefore, the present disclosure obtains the real-time manufacturing data of each object platform in real time, and forms new event sequence data for analysis and prediction after data conversion and processing, thus, the manufacturing tasks may be analyzed and predicted in real time based on the Internet of Things structure, and a security and stability of the intelligent manufacturing system may be ensured in the manufacturing process.

In the current technology, manufacturing equipment or management equipment, systems, etc. of an intelligent manufacturing system generally execute corresponding manufacturing tasks or management processes according to design procedures or logic instructions to realize an intelligent production. Sometimes, due to a task adjustment, emergencies, a temporary replacement of manufacturing data, and other situations, a corresponding information input end or user end may send some instructions to adjust the manufacturing tasks irregularly, such as adjusting working conditions and parameters of some intelligent manufacturing equipment, changing product processing sequences or times, and opening and closing some manufacturing equipment or management equipment, etc. These temporary instructions enrich an application environment of the intelligent manufacturing system and play a good role in regulation and management. However, in an actual use process, because the intelligent manufacturing device, a management device, a monitoring device, etc. involved by the intelligent manufacturing may usually correspond to different levels, different regions, and different categories, most of which may be on a production line or manufacturing line, and manufacturing tasks of which may be related to and affect each other. When there are one or more instructions for intelligent manufacturing control, the intelligent manufacturing equipment or intelligent management equipment involved in the instructions may form an instruction conflict or task conflict with other equipment when running the instructions, resulting in an equipment program error, a deadlock, or an equipment crash, it may also affect smooth connections of processes, a material transportation sequence, equipment processing steps, etc. during manufacturing, which may lead to a large-scale failure, a paralysis, or an error reporting of the intelligent manufacturing equipment, and trigger manufacturing risks.

The method of event sequence analysis and prediction of this embodiment may build the Internet of Things based on a five platform structure, the service platform and the sensor network platform may be arranged in an independent layout, and different sub platforms of the service platform or different sub platforms of the sensor network platform may correspond to different sub platforms of the management platform and the one or more object platforms, so that different sensor network platforms and service platforms may be set for different object platforms to facilitate a classified transmission, traceability of data, and classified issuance and processing of instructions, which may make a structure of the Internet of Things and data processing clear and controllable to facilitate the management and control of the Internet of Things and the data processing. Secondly, the management platform may adopt the rear sub platform layout, and each sub platform of the management platform may correspond to an independent sub platform of the service platform, so that the sub platform of the management platform may ensure that data source of the service platform is independent, in addition, the sub platforms of the management platform may also form the sequence modeling data for use by the general platform of the management platform, so as to share data processing pressure of the general platform of the management platform and reduce a data processing capacity demand of each platform of the management platform. The general platform of the management platform may process and analyze all the sequence modeling data, coordinate all instruction data, and perform an instruction analysis and prediction, thus ensuring a coordination and implementation of overall instructions of the Internet of Things, carrying out risk management and control, and realizing a smooth implementation of relevant intelligent manufacturing tasks through reasonable framework structure of the Internet of Things.

The above specific embodiments have further detailed the purpose, technical scheme, and beneficial effects of description of the present disclosure. It should be understood that the above are only the specific embodiments of the description and are not used to limit the scope of protection of the present disclosure. Any made modification, equivalent replacement, and improvement within the spirit and principles of the present disclosure should be included in the scope of protection of the present disclosure.

Figure 2:
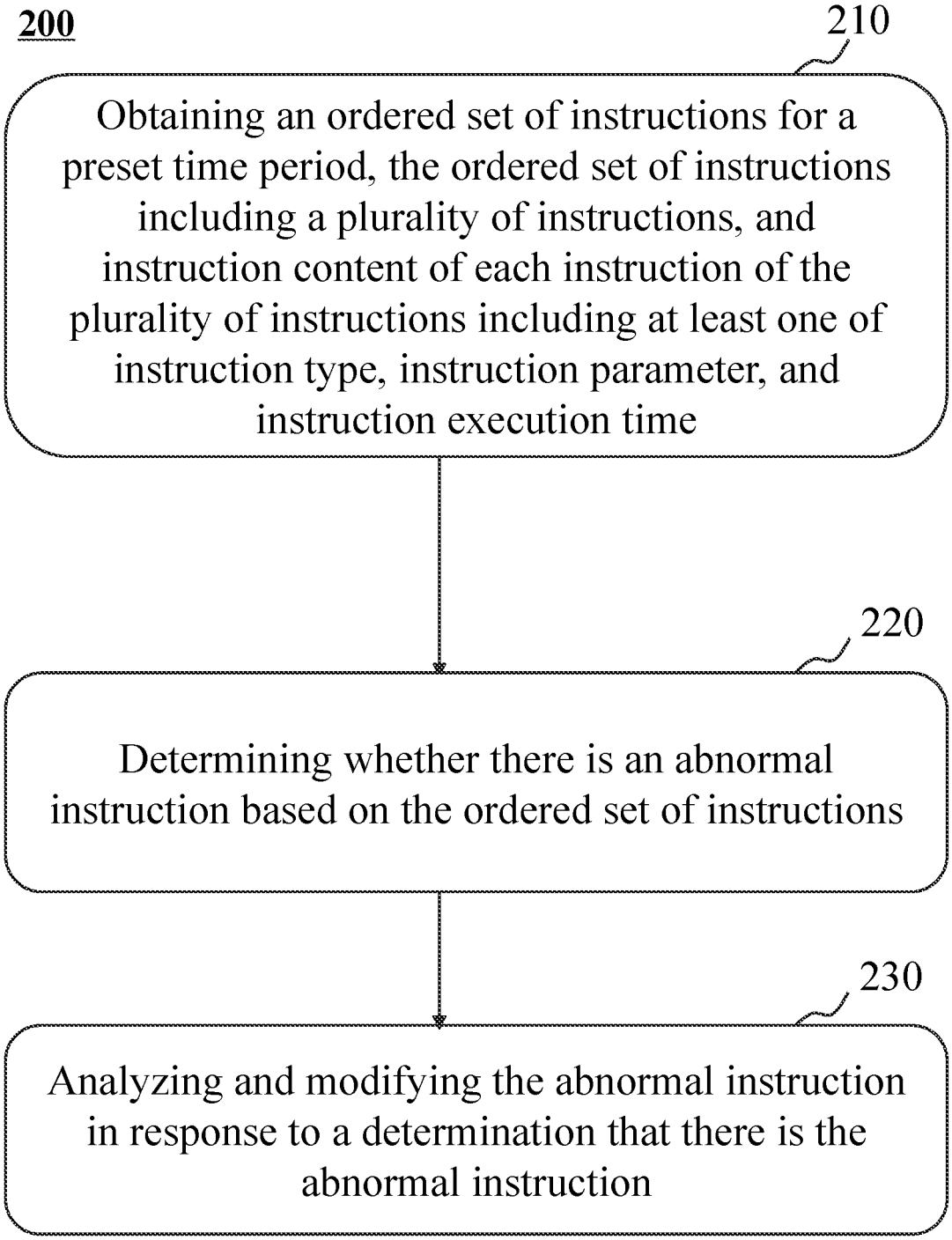
FIG. 2 is a flowchart of a method of an event sequence analysis and prediction according to some embodiments of the present disclosure.

FIG. 2 is a flowchart of a method of an event sequence analysis and prediction according to some embodiments of the present disclosure. In some embodiments, a process 200 shown in FIG. 2 is executed by the management platform.

In step 210, obtaining an ordered set of instructions for a preset time period. The ordered set of instructions may include a plurality of instructions, and instruction content of each instruction of the plurality of instructions may include at least one of instruction type, instruction parameter, and instruction execution time.

The ordered set of instructions may be a set of instructions formed by arranging the control instructions issued within a certain time period according to a preset order. The preset order may be, for example, a time sequence of issuance of instructions. In some embodiments, each instruction in the ordered set of instructions may include content information such as instruction types, instruction parameters, instruction execution times, etc. For example, the ordered set of instructions may include at least one set of blanking-stamping-trimming-cleaning instructions arranged in order, the blanking instructions may include blanking execution times and blanking instruction parameters, such as production parameters; the stamping instructions may include stamping execution times and stamping instruction parameters, such as stamping sequences, thicknesses after stamping, etc.; the trimming instructions may include trimming execution times and trimming instruction parameters, such as trimming times; and the cleaning instructions may include cleaning execution times and cleaning instruction parameters, such as cleaning times.

By way of example only, the ordered set of instructions may include following data sequence: $A_1B_1C_1D_1A_1A_1C_2D_2A_1A_1C_3D_2A_1A_1B_2C_4D_2$. This sequence may indicate that production line equipment executes an instruction $A_1$ (for example, blanking), then executes an instruction $B_1$, then executes an instruction $C_1, \ldots,$ and finally executes an instruction $D_2$. A, B, C, and D may represent instruction types arranged in a time order, for example, corresponding to blanking, stamping, trimming, and cleaning, a same instruction type with different corner marks may indicate different production parameters. For example, $A_1$ and $A_2$ may represent different blanking parameters, for example, blanking 10 kg and blanking 100 kg.

The instruction types may refer to category information of the instructions and may be determined based on a process flow to which the instructions belong. For example, the instruction type may include the blanking, stamping, trimming, cleaning, etc.

The instruction parameters may be specific content information or execution parameters contained in instructions corresponding to each instruction type. For example, the blanking instructions may need to involve parameters such as types, compositions, sizes, and thicknesses of raw materials, blanking angles and positions, and utilization rates of materials. The stamping instructions may require parameters such as a friction, a stamping pressure, and a stamping sequence.

Instruction execution times may be time required to complete a certain process flow or time when the instructions start to be executed. For example, a completion time of the blanking instructions is 3 minutes, and an execution time of the blanking instructions may be 3 minutes. For example, an execution time of the stamping instruction may be 7:10, or 10 minutes later.

In some embodiments, the management platform may obtain an ordered set of instructions within a preset time period. The preset time period may be set manually, and execution time of instructions in the obtained ordered set of instructions may be within the preset time period.

In some embodiments, the preset time period may be a cycle of a corresponding process flow. For example, if a process cycle of the stamping process is 10 minutes, the preset time period may be 10 minutes. That is, the management platform may obtain instructions from a certain time point to next 10 minutes as the ordered set of instructions corresponding to the stamping process.

In step 220, determining whether there is an abnormal instruction based on the ordered set of instructions.

The abnormal instruction may be an instruction that cannot be executed normally or may cause a system exception or other instructions to be executed normally. For example, instructions with incorrect blanking angle and blanking position parameters or instructions with stamping strength beyond a material bearing range.

In some embodiments, the abnormal instruction may be determined based on a variety of ways. For example, the management platform may check whether instruction content of each instruction in the ordered set of instructions is reasonable based on each instruction in the ordered set of instructions in combination with a preset instruction cross reference table. The instruction cross reference table may be a reasonable parameter range or reasonable content diagram of each instruction sorted in advance.

In some embodiments, the management platform may determine whether there is any abnormal instruction based on the ordered set of instructions, and perform the following operations: determining a rationality of each instruction in the ordered set of instructions; determining an instruction as the abnormal instruction in response to a determination that the rationality of the instruction is not satisfying a preset condition. For details of determining an abnormal instruction, please refer to the description in other parts of the present disclosure, for example, FIG. 4.

In some embodiments, the management platform may further be configured to obtain a set of historical abnormal frequent items, and the set of historical abnormal frequent items may include a plurality of abnormal frequent items that satisfy preset requirements; the preset requirements satisfied by the abnormal frequent items may include that a support degree satisfies a first condition and a count of items satisfies a second condition; determine that an instruction of the abnormal frequent items included in the ordered set of instructions may be the abnormal instruction based on the ordered set of instructions. For details of determining the abnormal instruction, please refer to the description in other parts of the present disclosure, for example, FIG. 6.

In step 230, analyzing and modifying the abnormal instruction in response to a determination that there is the abnormal instruction.

In some embodiments, when analyzing the abnormal instruction, the management platform may apply the ordered set of instructions containing the abnormal instructions to a simulation environment or a test environment for execution, analyze execution results, and determine whether the execution results satisfy the preset requirements. The preset requirements may include that the products satisfy inspection standards of corresponding processes.

In some embodiments, the management platform may modify the instruction parameters or instruction execution time of the abnormal instructions in the ordered set of instructions according to the analysis results based on the ordered set of instructions. For example, after an analysis of the execution results, the management platform may adjust abnormal instruction parameters according to the execution results, and then execute repeatedly until the execution results satisfy the preset requirements, and then take modified instructions as instructions that may be executed in a formal environment. For example, if a blanking instruction is determined to be an abnormal instruction, and an analysis result after execution in the test environment may be that a blanking angle position parameter is unreasonable, the management platform may modify a blanking angle in turn by increasing the blanking angle by 5° each time, and analyze an execution result after each modification. When the execution result satisfies the preset requirements, a current blanking angle may be taken as modified blanking instructions.

The management platform may judge and correct the abnormal instructions through the above methods, which can eliminate the abnormality in advance before a formal production, and play a preventive role to prevent an occurrence of abnormality affecting production. When judging whether an instruction is abnormal, environmental factors and historical frequent items may also be considered to make the judgment of the abnormal instruction more accurate. For example, when determining whether the stamping instruction is abnormal, an estimated effect of an execution of the stamping instructions may be also considered. When modifying the instructions, the instructions may be modified according to a coordination of an overall event, which greatly improves an efficiency of the modification.

FIG. 3 is a flowchart of a method of an Industrial Internet of Things based on an event sequence analysis and prediction according to some embodiments of the present disclosure. A process 300 may include the following steps.

The method may include follow steps.

In step 310, when the user platform sends a manufacturing task instruction, a corresponding sub platform of the service platform receiving the manufacturing task instruction, converting the manufacturing task instruction into a configuration file recognized by the management platform, and sending the configuration file to a corresponding sub platform of the management platform, the manufacturing task instruction including at least one manufacturing task and an execution time corresponding to the manufacturing task.

In step 320, the corresponding sub platform of the management platform receiving the configuration file, using a cyclic neural network model to carry out a sequence modeling for data in the configuration file in time order to form sequence modeling data, and sending the sequence modeling data together with the configuration file to the general platform of the management platform.

In step 330, after receiving and storing the corresponding sequence modeling data, the general platform of the management platform decomposing the sequence modeling data sent by all the sub platforms of the management platform according to execution times, and sorting all decomposed sequence modeling data according to a sequence logic order from beginning to end to form a series of event sequence data, each sequence corresponding to a sequence point, the general platform of the management platform analyzing and predicting the event sequence data through a probability suffix tree model, and executing based on an analysis and prediction result.

In step 340, when the analysis and prediction result is that the task is normal, the general platform of the management platform sending received configuration files to a corresponding sub platform of the sensor network platform, the corresponding sub platform of the sensor network platform receiving the configuration files and converting the configuration files into instruction files recognizable by the one or more object platforms and sending the instruction files to the one or more object platforms, and the one or more object platforms receiving the instruction files and executing an intelligent manufacturing based on the instruction files.

In step 350, when the analysis and prediction result is that the task is abnormal, the general platform of the management platform refusing to receive all the configuration files corresponding to the manufacturing task, deleting the corresponding sequence modeling data, obtaining associated manufacturing data corresponding to abnormal timing points, and sending the associated manufacturing data to a corresponding sub platform of the management platform, the corresponding sub platform of the management platform compiling the associated manufacturing data and sending the associated manufacturing data to a corresponding sub platform of the service platform, the corresponding sub platform of the service platform storing the associated manufacturing data and sending a task failure instruction to the user platform; the associated manufacturing data including associated sequence modeling data corresponding to the abnormal timing points, sub platform information of the management platform corresponding to the sequence modeling data, and sub platform information of the service platform.

Those of ordinary skill in the art can realize that units and algorithm steps of each example described in connection with the embodiments disclosed herein can be realized by electronic hardware, computer software, or any combination thereof. In order to clearly explain an interchangeability of hardware and software, compositions and steps of each example have been generally described in the above description according to functions. Whether these functions are performed in hardware or software depends on the specific application and design constraints of the technical solution. A person skilled in the art may use different methods to realize the described functions for each specific application, but such realization should not be considered beyond the scope of the present disclosure.

In the embodiments provided in the present disclosure, it should be understood that the disclosed equipment and method may be realized in other ways. For example, the equipment embodiments described above are only illustrative. For example, a division of the units is only a logical function division. In actual implementation, there may be another division mode, for example, a plurality of units or components may be combined or integrated into another system, or some features may be ignored or not implemented. In addition, mutual couplings or direct couplings or communication connections shown or discussed may be indirect couplings or communication connections through some interfaces, devices, or units, or may be electrical, mechanical, or other forms of connection.

The units described as separate components may or may not be physically separate, and may be implemented in electronic hardware, computer software, or any combination thereof. Whether these functions are performed in hardware or software may depend on a specific application and design constraints of the technical solution. Different methods may be used for each specific application to implement the described functions, but such implementation should not be considered beyond the scope of the present disclosure.

In addition, each function unit in each embodiment of the present disclosure may be integrated into one processing unit, or each unit may physically exist separately, or two or more units may be integrated into one unit. The above integrated unit may be realized in a form of hardware or software function units.

If the integrated unit is realized in the form of software function units and sold or used as an independent product, the integrated unit may be stored in a computer-readable storage medium. Based on this understanding, essence or parts of the technical solution of the present disclosure that contributes to the prior art, or all or part of the technical solution may be embodied in a form of a software product, which may be stored in a storage medium, including a plurality of instructions for causing a computer device (which may be a personal computer, a server, or a grid device, etc.) to perform all or part of the steps of the method described in each embodiment of the present disclosure. The aforementioned storage medium may include a U disk, a mobile hard disk, a read-only memory (ROM), a random access memory (RAM), a magnetic disk, or an optical disk and other medium that may store program codes.

FIG. 4 is an exemplary flowchart of determining an abnormal instruction according to some embodiments of the present disclosure. In some embodiments, a process 400 shown in FIG. 4 may be performed by the management platform.

In step 410, determining the rationality of each instruction in the ordered set of instructions.

The rationality may indicate whether the instruction content conforms to a normal logic. The rationality may include 0 and 1, 0 indicates unreasonable and 1 indicates reasonable. In some embodiments, the rationality of the instructions may be related to the instruction parameters, an instruction order, and other factors. The instruction parameters may include parameter information such as production parameters. See FIG. 2 for more description of the instruction parameters.

The production parameters may include inherent parameters of materials related to production, inherent parameters of production line equipment. The inherent parameters of materials may include materials, compositions, types, hardness, shapes, sizes, etc. The inherent parameters of the production line equipment may include sizes and capacities of the production line equipment.

Instructions that conform to the production parameters and a normal order of a production are reasonable. For example, if a blanking amount in the blanking instructions is greater than a maximum capacity of a discharging chamber in the equipment, the blanking instructions may be unreasonable. For another example, the normal order of a production is blanking-stamping-trimming-cleaning. If the instruction order in the instructions is blanking-stamping-trimming-cleaning, it may indicate that the instructions are unreasonable.

In some embodiments, the rationality of the instructions may also be related to a stamping effect after execution. If the stamping effect exceeds a preset threshold, the instructions may be reasonable; otherwise, the instructions may be unreasonable. For details of the stamping effect, please refer to the description in other parts of the present disclosure, for example, FIG. 5.

The management platform may set a reasonable parameter range for each instruction parameter, and determine the rationality of the instruction by comparing the instruction parameter in the instruction with a reasonable parameter range corresponding to the instruction. The reasonable parameter range may be the range of instruction parameters that the production line equipment can bear to ensure normal operation, and the reasonable parameter range may be manually set. When the instruction parameters in the instruction exceed the reasonable parameter range corresponding to the instruction, the instruction may be unreasonable, for example, a rationality value of the instruction may be 0. When the instruction parameters in the instruction do not exceed the reasonable parameter range corresponding to the instruction, the corresponding instruction may be reasonable, and the rationality value of the instruction may be 1.

In some embodiments, in order to ensure better a product quality or a production effect, during production, the management platform may need to determine best instruction parameters within the reasonable parameter range to obtain a better production effect. The best instruction parameters may be different under different production environments and conditions. In this embodiment, the management platform may first screen out or correct the instructions that exceed the reasonable parameter range based on the rationality value, so as to quickly determine the best instruction parameters when there is a need to determine the best instruction parameters.

In step 420, determining an instruction as the abnormal instruction in response to a determination that the rationality of the instruction is not satisfying a preset condition.

The preset condition may mean that the instruction is reasonable, for example, the rationality value may be 1. If the preset conditions are not satisfied, the instruction may be unreasonable. For example, the instruction with the rationality value of 0 may be determined as an abnormal instruction.

The rationality is judged according to relationships of the instruction parameters, the production parameters, the instruction orders, and other factors, and then it is judged whether the instruction is the abnormal instruction, which may make a judgment of the abnormal instruction more accurate.

Figure 5:
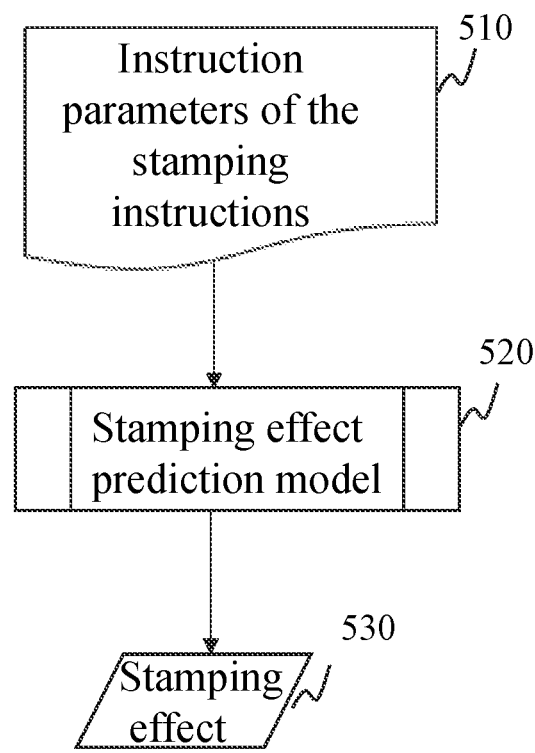
FIG. 5 is a schematic diagram for determining the stamping effect according to some embodiments of the present disclosure.

FIG. 5 is a schematic diagram for determining the stamping effect according to some embodiments of the present disclosure.

In some embodiments, the rationality of the instruction may be also related to an estimated stamping effect of the instruction.

The stamping effect 530 may refer to an evaluation of a stamping process. The stamping effect 530 may refer to an evaluation of a product obtained by the stamping process. The stamping effect may be expressed based on a variety of forms, for example, vectors.

In some embodiments, the stamping effect 530 may include differences between thicknesses of different positions of the product after stamping and the standard thickness. Elements in a corresponding stamping effect vector may represent different positions of the product and a difference between a thickness of a position after stamping and the standard thickness, different positions of the product may be represented by numbers or other forms. For example, the stamping effect vector may be (1, 0.1), 1 may represent a most middle position of the product, and corresponding relationships between different positions and numbers may be preset. 0.1 may indicate that the difference between the thickness of the position after stamping and the standard thickness is 0.1 cm.

In some embodiments, the stamping effect 530 may include defects at different positions of the product after stamping. An element value in the corresponding stamping effect vector may be a type of a defect and a severity of the defect. The type of a defect may include a tensile crack, a wrinkle, a bulge, a pockmark, a rebound, etc. The type of a defect may be corresponding to different numerical ranges, for example, 0 represents no defect, (0,1] represents the wrinkle, (1,2] represents the tensile crack, (2, 3] represents the rebound, etc. In each value interval, the larger a value is, the greater a severity of the type of a defect is. For example, both 1.2 and 1.7 may indicate the tensile cracking, and a tensile cracking degree of the product corresponding to 1.7 is higher than that of 1.2. The elements in the corresponding stamping effect vector may represent the different positions of the product and defects at the position after stamping, and the defects after stamping may be represented by numbers or other forms. For example, the stamping effect vector may be (1, 1.7), 1 may represent the most middle position of the material, 1.7 may represent that the defect at the position after stamping is the tensile crack, and an evaluation value of a degree of the tensile crack is 1.7.

In some embodiments, the stamping effect 530 may be predicted based on a stamping effect prediction model 520. The stamping effect prediction model 520 may be a machine learning model. For example, the stamping effect prediction model 520 may be a depth neural network model. An input of the stamping effect prediction model 520 may be instruction parameters of the stamping instructions 510, and an output of the stamping effect prediction model 520 may be a predicted stamping effect 530. For example, the output of the stamping effect prediction model 520 may be the stamping effect vector.

In some embodiments, the stamping effect prediction model 520 may be obtained by training. For example, training samples are input into an initial stamping effect prediction model, a loss function is established based on labels and output results of the initial stamping effect prediction model, and parameters of the initial stamping effect prediction model are updated. When the loss function of the initial stamping effect prediction model satisfies preset conditions, a model training may be completed. The preset conditions may be a convergence of the loss function and a count of iterations reaching a threshold.

In some embodiments, the training samples may be historical instruction parameters of historical stamping instructions, and the training samples may be obtained based on historical data. Labels of the training samples may be stamping effects corresponding to the historical stamping instructions. The labels may be manually labeled.

In some embodiments, threshold values may be set for a difference between thicknesses of different positions of the material after stamping and the standard thickness and defect degrees of different positions after stamping. When the corresponding threshold value is exceeded, the rationality value may be 0, that is, corresponding instructions are unreasonable. For example, a threshold value of a difference between thicknesses of different positions of the product and the standard thickness may be set as 0.5, and when the stamping effect vector is expressed by the difference between the thicknesses of different positions of a material product after stamping and the standard thickness, and the stamping effect vector is (1, 0.7), it may indicate that the instructions are unreasonable.

When judging whether the stamping instructions are abnormal, a prediction effect of an execution of the stamping instructions may be considered, instead of judging whether the instructions are abnormal from the instruction parameters, which can make a judgment of the abnormal instruction more accurate.

Figure 6:
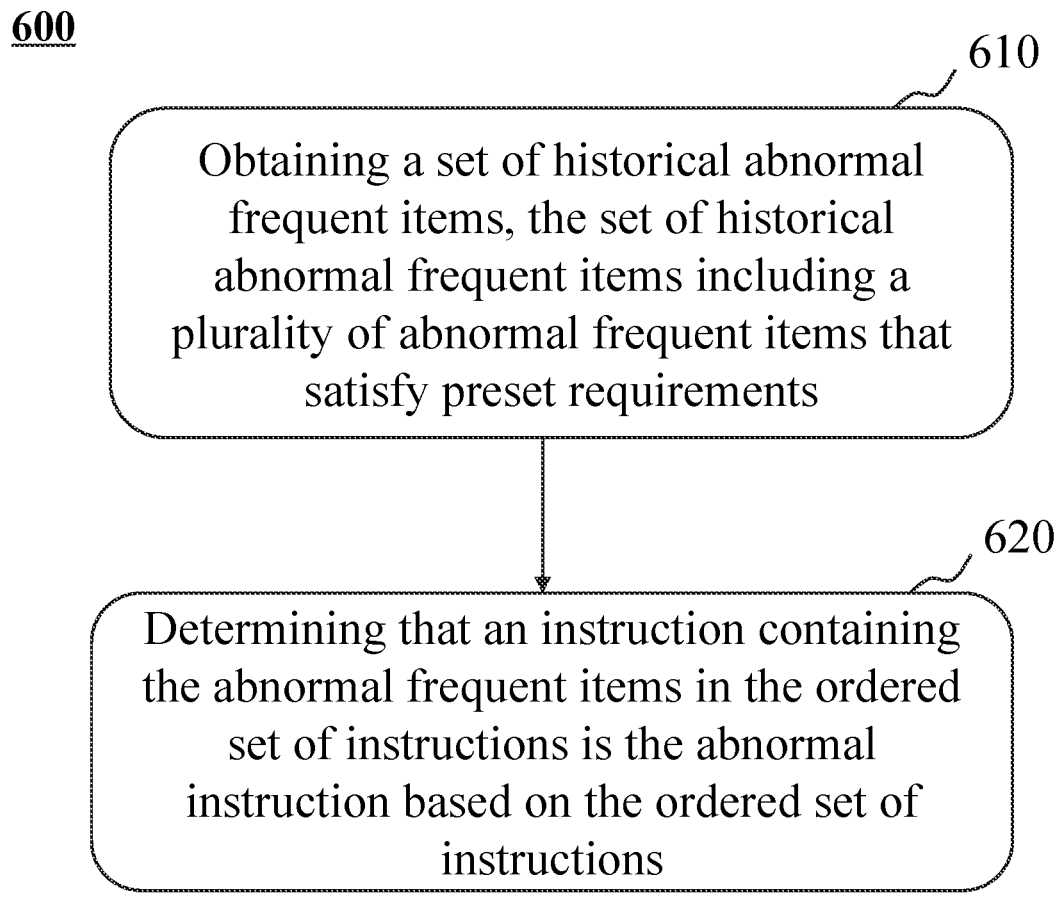
FIG. 6 is an exemplary flowchart of determining an abnormal instruction according to some embodiments of the present disclosure.

FIG. 6 is an exemplary flowchart of determining an abnormal instruction according to some embodiments of the present disclosure. In some embodiments, a process 600 shown in FIG. 6 may be executed by the management platform.

In step 610, obtaining a set of historical abnormal frequent items, the set of historical abnormal frequent items including a plurality of abnormal frequent items that satisfy preset requirements.

The abnormal frequent items may refer to ordered abnormal instructions or a combination of abnormal instructions that satisfy the preset requirements in the ordered set of historical instructions. For example, the ordered abnormal instructions are $A_1B_1C_1D_1A_1B_1C_2D_2$, "$A_1B_1$", "$A_1$", and "$B_1$" may be abnormal frequent items. The set of the abnormal frequent items may refer to an instruction set including one or more abnormal frequent items. For example, the set of the abnormal frequent items may be $(A_1B_1, A_1, B_1)$.

In some embodiments, the management platform may determine historical abnormal frequent items from an ordered set of historical instructions. In some embodiments, the preset requirements satisfied by the abnormal frequent items may include that: a support degree satisfies a first condition, and a count of items satisfies a second condition.

A support degree may refer to a frequency of occurrence of an abnormal instruction or a combination of abnormal instructions in all data.

The first condition may mean that support degrees of the historical abnormal frequent items are equal to or greater than a support degree threshold value. For example, if occurrence times of historical abnormal items "AA", "AB", "AC", and "BCD" are 1, 2, 3, and 4 respectively, and the support degree threshold is 3, then "AC" and "BCD" may be considered to satisfy the first condition.

The second condition may mean that the count of items of instruction parameters included in the historical abnormal frequent items should be equal to or greater than a count of items threshold. For example, the historical abnormal frequent items include "A1", "$A_1A_1$", the count of items of instruction parameters in "A1" may be 1, and the count of items of instruction parameters in "$A_1A_1$" may be 2. If the count of items threshold is set to 2, a count of items of instruction "$A_1A_1$" may satisfy the second condition.

Specifically, the management platform may determine a second data set based on a first data set, determine a third data set based on a value of each data in the second data set, and determine the historical abnormal frequent items based on the value of each data in the third data set. The first data set may be a historical abnormal instruction set, and the historical abnormal instruction set may be instructions corresponding to abnormal conditions in the history. The value of each data in the second data set may refer to a count of occurrences of data in the first data set. The third data set may be a set of abnormal frequent items whose values of data in the second data set are equal to and/or greater than the support degree threshold (i.e., satisfying the first condition) and whose count of items satisfies the second condition, i.e., the abnormal frequent item set. In some embodiments, the third data set may be determined using algorithms such as FP-Growth and Apriori.

As an example only, the management platform may first determine a historical abnormal item set corresponding to the abnormal conditions from an ordered set of historical instructions. There are four instruction types (for example, A, B, C, D) in the historical abnormal item set. Within a time period (for example, within 1 day), a sequence of abnormal instructions sequentially executed by the production line equipment is: $A_1B_1C_1D_1A_1A_1C_2D_2A_1A_1C_3D_2A_1A_1B_2C_4D_2$ (i.e., the first data set). This sequence may indicate that the production line equipment first executes the instruction $A_1$ (for example, blanking), then executes the instruction $B_1$, then executes the instruction $C_1, \ldots,$ and finally executes the instruction $D_2$.

For the ordered set of instructions, it may be split into a plurality of K tuples. The count of items of instruction parameters contained in each k-tuple may be k. A k-tuple may refer to a set containing k items, that is, every adjacent k elements form a k-tuple, independent of other factors (e.g., time). For example, when the k-tuple is a tuple, each element may be a group, i.e., "$A_1$", "$B_1$", "$C_1$", etc. For another example, when the k-tuple is a triple, every adjacent three elements are a group, i.e., "$A_1B_1C_1$", "$B_1C_1D_1$", "$C_1D_1A_1$", etc.

The third data set may include all k-tuples that satisfy the first condition and the second condition. The first condition may be that the count of occurrences of the k-tuple in the sequence (i.e., the first data set) exceeds the support degree threshold. The support degree may be set in advance or adopt a default value. For example, the support degree is 3, at this time, the obtained corresponding k-tuple may include a 1-tuple "$A_1$" and "$D_2$" and a 2-tuple "$A_1A_1$". The second condition may be that k is equal to or greater than the count of items threshold, for example, if the count of items threshold is 2, the third data set may include "$A_1A_1$".

In some embodiments, the support degree threshold may be related to the count of items of instruction parameters included in the abnormal items. The management platform may determine different support degree thresholds according to the count of items of instruction parameters included in the abnormal items, and then determine the abnormal frequent items. The larger the count of items of instruction parameters included in the abnormal items is, the smaller the support degree threshold may be set. For example, the abnormal items are 3-tuples (i.e., including three elements and the count of items is 3), a corresponding support degree threshold may be set as 10, the abnormal items are 4-tuples, i.e., the count of items is 4, and a corresponding support degree threshold may be set as 8. Finally, a 3-tuples with support degree over 10 and a 4-tuples with support degree over 8 may be determined as the abnormal frequent items, for example, the abnormal items may include "$A_1B_1C_1$", "$B_1C_1D_1$", "$C_1D_1A_1B_1$", "$A_2B_2C_2D_2$", the corresponding support degree may be 10 times, 8 times, 8 times, and 6 times respectively, then final abnormal frequent items are "$A_1B_1C_1$" and "$C_1D_1A_1B_1$".

The larger the count of items of instruction parameters in an abnormal item is, the smaller a support degree of the abnormal item is. Therefore, the support degree threshold corresponding to the abnormal item containing a large count of items of instruction parameters may be appropriately reduced, so as to prevent an omission of abnormal frequent items.

In step 620, determining that an instruction containing the abnormal frequent items in the ordered set of instructions is the abnormal instruction based on the ordered set of instructions.

In some embodiments, the management platform may determine instructions containing the abnormal frequent items in the ordered set of instructions as abnormal instructions by matching the abnormal frequent items in a determined historical abnormal frequent item set with the instructions in a current ordered set of instructions. For example, if a historical abnormal frequent item is "$A_1B_1$", the ordered set of instructions includes $A_1B_1C_1D_1$, $A_1A_1C_1$, and $A_1B_2C_2$, then the ordered set of instructions $A_1B_1C_1D_1$ may include the historical abnormal frequent item "$A_1B_1$", then the abnormal frequent item contained in the current ordered set of instructions may be an instruction $A_1B_1C_1D_1$, which may be determined as an abnormal instruction.

In some embodiments, since the ordered set of instructions includes ordered instructions, an execution order may need to be considered when the ordered set of instructions matches the historical abnormal frequent items. For example, the ordered set of instructions includes $A_1B_1C_1D_1$ and $A_1C_1B_1D_1$, and a historical abnormal frequent item is "$B_1C_1$", then $A_1B_1C_1D_1$ may be the abnormal instruction.

In some embodiments, when the abnormal frequent items are matched in the ordered set of instructions, a matching may also be performed based on stamping effects. Specifically, when the stamping effects corresponding to any two ordered instructions in the ordered set of instructions are the same or similar, the two ordered instructions may be determined as same instructions. When one of the two ordered instructions is determined as an abnormal instruction, the other instruction may also be determined as an abnormal instruction. It is determined whether the stamping effects are the same or similar according to a vector distance between stamping effect vectors of any two ordered instructions. If the vector distance is 0, two stamping effects corresponding to two ordered instructions may be considered to be same, and if the vector distance is less than a preset value, the two stamping effects corresponding to two ordered instructions may be considered to be similar. As an example only, two ordered instructions are $A_1B_1C_1D_1$ and $A_1B_2C_1D_1$ respectively, corresponding stamping effect vectors determined by the stamping effect prediction model may be the same. When $A_1B_1C_1D_1$ is an abnormal instruction, $A_1B_2C_1D_1$ may also be determined as the abnormal instruction. For details of the stamping effect, please refer to other parts of the present disclosure, for example, FIG. 5.

If different stamping instruction parameters lead to similar stamping effects, two instructions may be regarded as the same instruction, which can make determination of the abnormal frequent items more accurate.

The abnormal frequent items may reflect internal relationships between instructions. The abnormal frequent items may be used to determine abnormal instructions. A distribution of instructions when an abnormal condition occurs may be learned through historical data, so as to determine the abnormal instructions in a statistical sense and improve judgment accuracy of the abnormal instructions.

It should be noted that different embodiments may produce different beneficial effects. In different embodiments, possible beneficial effects may be any one or combination of the above, or any other possible beneficial effects.

The basic concepts have been described above. Obviously, for those skilled in the art, the above detailed disclosure is only an example and does not constitute a limitation of the present disclosure. Although it is not explicitly stated here, those skilled in the art may make various modifications, improvements, and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

In some embodiments, numbers describing the number of components and attributes are used. It should be understood that such numbers used in the description of embodiments are modified by the modifier "about", "approximate" or "generally" in some examples. Unless otherwise stated, "approximately" or "generally" indicate that a ±20% change in the figure is allowed. Accordingly, in some embodiments, the numerical parameters used in the description and claims are approximate values, and the approximate values can be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials cited in the present disclosure, such as articles, books, specifications, publications, documents, etc., the entire contents are hereby incorporated into the present disclosure for reference. Except for the application history documents that are inconsistent with or conflict with the contents of the present disclosure, and the documents that limit the widest range of claims in the present disclosure (currently or later appended to the present disclosure). It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. An Industrial Internet of Things system based on event sequence analysis and prediction, comprising a user platform, a service platform, a management platform, a sensor network platform, and one or more object platforms, which are interacted sequentially from top to bottom, wherein the service platform and the sensor network platform are both arranged in an independent layout, and the management platform is arranged in a rear sub platform layout; the independent layout means that the service platform and the sensor network platform are provided with a plurality of independent sub platforms, and the plurality of independent sub platforms respectively perform data storage, data processing and/or data transmission for different data; the rear sub platform layout means that the management platform is provided with a general platform of the management platform and a plurality of sub platforms of the management platform, the plurality of sub platforms of the management platform respectively store and process data of different types or different receiving objects sent by the service platform, and the general platform of the management platform stores and processes data of the plurality of sub platforms of the management platform after summarizing, and transmits the data of the plurality of sub platforms of the management platform to the sensor network platform; and the one or more object platforms is configured as one or more intelligent manufacturing device;

a corresponding sub platform of the service platform is configured to receive a manufacturing task instruction sent by the user platform, convert the manufacturing task instruction into a configuration file recognized by the management platform, and send the configuration file to a corresponding sub platform of the management platform, wherein the manufacturing task instruction includes at least one manufacturing task and an execution time corresponding to the manufacturing task;

the corresponding sub platform of the management platform is configured to receive the configuration file, use a cyclic neural network model to carry out a sequence modeling for data in the configuration file in time order to form sequence modeling data, and send the sequence modeling data together with the configuration file to the general platform of the management platform;

after receiving and storing the corresponding sequence modeling data, the general platform of the management platform is configured to decompose the sequence modeling data sent by all the sub platforms of the management platform according to execution times, and sort all decomposed sequence modeling data according to a sequence logic order from beginning to end to form a series of event sequence data, wherein each sequence corresponds to a sequence point, the general platform of the management platform analyzes and predicts the event sequence data through a probability suffix tree model, and executes operations based on an analysis and prediction result, the operations including:

when the analysis and prediction result is that the task is normal, sending received configuration files to a corresponding sub platform of the sensor network platform, the corresponding sub platform of the sensor network platform receiving the configuration files and converting the configuration files into instruction files recognizable by the one or more object platforms and sending the instruction files to the one or more object platforms, and the one or more object platforms receiving the instruction files and executing intelligent manufacturing based on the instruction files; or when the analysis and prediction result is that the task is abnormal, refusing to receive all the configuration files corresponding to the manufacturing task, deleting the corresponding sequence modeling data, obtaining associated manufacturing data corresponding to abnormal timing points, and sending the associated manufacturing data to a corresponding sub platform of the management platform, the corresponding sub platform of the management platform compiling the associated manufacturing data and sending the associated manufacturing data to a corresponding sub platform of the service platform, the corresponding sub platform of the service platform storing the associated manufacturing data and sending a task failure instruction to the user platform; wherein the associated manufacturing data includes associated sequence modeling data corresponding to the abnormal timing points, sub platform information of the management platform corresponding to the sequence modeling data, and sub platform information of the service platform.

2. The Industrial Internet of Things system based on the event sequence analysis and prediction of claim 1, wherein the corresponding sub platform of the management platform is further configured to receive the configuration file and extract the manufacturing task and the execution time corresponding to the manufacturing task in the configuration file;

input the manufacturing task and the execution time corresponding to the manufacturing task into the cyclic neural network model, output sequence codes of the execution time and execution codes of the manufacturing task, associate the sequence codes and the corresponding execution codes, sort all the sequence codes according to a sequence, and perform the sequence modeling for the sequence codes and the execution codes; and send the sequence modeling data as final data, which is formed by the sequence modeling, together with the configuration file to the general platform of the management platform.

3. The Industrial Internet of Things system based on the event sequence analysis and prediction of claim 2, wherein after receiving the corresponding sequence modeling data, the general platform of the management platform is further configured to extract the sequence modeling data sent by all the sub platforms of the management platform;

take the sequence codes and the corresponding execution codes as a group of data, and decompose all the sequence modeling data into a plurality of groups of sub data;

sort the sequence codes according to the sequence logic order, and sort all the execution codes from beginning to end according to the sequence logic order to form the series of event sequence data, wherein each different sequence corresponds to a different sequence point; and input the event sequence data to the probability suffix tree model, wherein the probability suffix tree model executes the execution codes in the event sequence data and performs analysis based on an execution codes result.

4. The Industrial Internet of Things system based on the event sequence analysis and prediction of claim 3, wherein the performing analysis based on an execution codes result includes:

inputting the execution codes as input data to the probability suffix tree model, wherein the probability suffix tree model simulates an operation of the execution codes, and outputs timing points that do not conform to operation rules of the probability suffix tree model as the abnormal timing points;

when there is at least one abnormal timing point in the probability suffix tree model, determining the task is abnormal; and when there is no abnormal timing point in the probability suffix tree model, determining the task is normal.

5. The Industrial Internet of Things system based on the event sequence analysis and prediction of claim 4, wherein the general platform of the management platform is further configured to:

sort the abnormal timing points output by the probability suffix tree model, and send the associated manufacturing data corresponding to each abnormal timing point to the sub platform of the management platform that sends the manufacturing task instruction;

the corresponding sub platform of the management platform sends the received associated manufacturing data of all the abnormal timing points to the corresponding sub platform of the service platform; and the corresponding sub platform of the service platform receives the associated manufacturing data and stores the associated manufacturing data into task exception comparison data according to the sequence logic order, and sends the task failure instruction to the user platform at a same time.

6. The Industrial Internet of Things system based on the event sequence analysis and prediction of claim 5, wherein after receiving the task failure instruction, the user platform is further configured to send an abnormal timing point query instruction to the corresponding sub platform of the service platform; and the corresponding sub platform of the service platform sends the associated manufacturing data to the user platform, and the user platform queries the abnormal timing points based on the associated manufacturing data.

7. The Industrial Internet of Things system based on the event sequence analysis and prediction of claim 3, wherein the cyclic neural network model and the probability suffix tree model are obtained through machine learning.

8. The Industrial Internet of Things system based on the event sequence analysis and prediction of claim 1, wherein the corresponding sub platforms of the sensor network platform are further configured to receive the real-time manufacturing data generated by all the object platforms when performing the intelligent manufacturing, compile the real-time manufacturing data into a compiled file recognized by the management platform, and send the compiled file to the general platform of the management platform;

after receiving the compiled file, the general platform of the management platform is further configured to send the compiled file to the corresponding sub platform of the management platform, the corresponding sub platform of the management platform receives and stores the compiled file, and performs the sequence modeling for the compiled file to form real-time sequence modeling data and sends the real-time sequence modeling data back to the general platform of the management platform; and the general platform of the management platform is further configured to receive the real-time sequence modeling data and replace corresponding original sequence modeling data with the real-time sequence modeling data according to a formation mode of the event sequence data to form new event sequence data, and analyze and predict based on the new event sequence data.

9. A control method of an Industrial Internet of Things system based on event sequence analysis and prediction, wherein the Industrial Internet of Things system based on the event sequence analysis and prediction comprises a user platform, a service platform, a management platform, a sensor network platform, and one or more object platforms, which are interacted sequentially from top to bottom, wherein the service platform and the sensor network platform are both arranged in an independent layout, and the management platform is arranged in a rear sub platform layout; the independent layout means that the service platform and the sensor network platform are provided with a plurality of independent sub platforms, and the plurality of independent sub platforms respectively perform data storage, data processing and/or data transmission for different data; the rear sub platform layout means that the management platform is provided with a general platform of the management platform and a plurality of sub platforms of the management platform, the plurality of sub platforms of the management platform respectively store and process data of different types or different receiving objects sent by the service platform, and the general platform of the management platform stores and processes data of the plurality of sub platforms of the management platform after summarizing, and transmits the data of the plurality of sub platforms of the management platform to the sensor network platform; and the one or more object platforms is configured as one or more intelligent manufacturing device;

the method comprises:

when the user platform sends a manufacturing task instruction, a corresponding sub platform of the service platform receiving the manufacturing task instruction, converting the manufacturing task instruction into a configuration file recognized by the management platform, and sending the configuration file to a corresponding sub platform of the management platform, wherein the manufacturing task instruction includes at least one manufacturing task and an execution time corresponding to the manufacturing task;

the corresponding sub platform of the management platform receiving the configuration file, using a cyclic neural network model to carry out a sequence modeling for data in the configuration file in time order to form sequence modeling data, and sending the sequence modeling data together with the configuration file to the general platform of the management platform;

after receiving and storing the corresponding sequence modeling data, the general platform of the management platform decomposing the sequence modeling data sent by all the sub platforms of the management platform according to execution times, and sorting all decomposed sequence modeling data according to a sequence logic order from beginning to end to form a series of event sequence data, wherein each sequence corresponds to a sequence point, and the general platform of the management platform analyzing and predicting the event sequence data through a probability suffix tree model, and executing operations based on an analysis and prediction result:

when the analysis and prediction result is that the task is normal, sending received configuration files to a corresponding sub platform of the sensor network platform, the corresponding sub platform of the sensor network platform receiving the configuration files and converting the configuration files into instruction files recognizable by the one or more object platforms and sending the instruction files to the one or more object platforms, and the one or more object platforms receiving the instruction files and executing intelligent manufacturing based on the instruction files; or when the analysis and prediction result is that the task is abnormal, refusing to receive all the configuration files corresponding to the manufacturing task, deleting the corresponding sequence modeling data, obtaining associated manufacturing data corresponding to abnormal timing points, and sending the associated manufacturing data to a corresponding sub platform of the management platform, the corresponding sub platform of the management platform compiling the associated manufacturing data and sending the associated manufacturing data to a corresponding sub platform of the service platform, the corresponding sub platform of the service platform storing the associated manufacturing data and sending a task failure instruction to the user platform; wherein the associated manufacturing data includes associated sequence modeling data corresponding to the abnormal timing points, sub platform information of the management platform corresponding to the sequence modeling data, and sub platform information of the service platform.

* * * * *